Patented Aug. 8, 1939

2,168,878

UNITED STATES PATENT OFFICE 2,168,878

CATALYTIC HYDROGENATION OF THE KETO GROUP OF CALCIUM 5-KETO-GLUCONATE AND PRODUCT

Richard Pasternack, Brooklyn, and Ellis V. Brown, Jamaica, N. Y., assignors to Charles Pfizer & Company, Brooklyn, N. Y., a corporation of New Jersey No Drawing. Application July 20, 1938, Serial No. 220,330

3 Claims. (Cl. 260—535)

This invention relates to the catalytic hydrogenation of the keto-group of calcium 5-keto-d-gluconate. This is the most readily available salt of 5-keto-gluconic acid. It may be prepared from d-glucose or d-gluconic acid, either by nitric acid oxidation (Kiliani, Berichte 55B:2817-2826, 1922) or by oxidative fermentation (Boutroux, Compt. rend., vol. 102:924, and 111:185).

Neither 5-keto-gluconic acid nor its known derivatives are of great stability, so that it was impossible to predict the conditions under which it could be hydrogenated without serious decomposition. Moreover, the calcium salt is so nearly insoluble in water that it could not have been expected to react.

It was found experimentally that Ipatieff's conditions for the reduction of sugars, heating the reaction mixture at 130° C. under a pressure of about 100 atmospheres in the presence of a nickel catalyst, completely destroyed the calcium 5-keto-gluconate. It is known in the art that metals of the platinum group usually catalyze hydrogenation under conditions less severe than those required for nickel. The calcium 5-keto-gluconate was therefore subjected to treatment with hydrogen at room temperature under 100 atmospheres pressure and in the presence of a palladium catalyst, but no visible hydrogen absorption took place. The temperature was then raised to 100° C. in the course of several hours, but still without result.

We have now found, however, that the nearly insoluble calcium 5-keto-gluconate may be successfully hydrogenated in aqueous suspension in the presence of a Rainey nickel catalyst at a temperature of 25 to 70° C. with a hydrogen pressure of some 80 atmospheres or more. Inasmuch as the calcium 5-keto-gluconate and its reduction products are neutral substances, the nickel catalyst is unaffected and can be used repeatedly. For the same reason corrosion-resisting equipment is not necessary and reaction can be carried out in an ordinary iron autoclave. At pressures below 80 atmospheres, hydrogenation is rather slow at the comparatively low temperature used, but for the preparation of a pure product temperatures above 65° C. are not advisable because they cause decomposition. Considerably higher pressures may be used without harmful effect. At any pressure substantially above 80 atmospheres with an efficient nickel catalyst hydrogenation takes place at a practical rate at temperatures as low as 40° C., and even proceeds slowly at room temperature.

The hydrogenation product is a mixture of calcium-l-idonate and calcium d-gluconate. Owing to the absence of side reactions when the reaction temperature has been kept below 65° C., the solution of calcium salts resulting from the hydrogenation, after removal of the catalyst by filtration, is sufficiently pure for pharmaceutical use. Many efforts have been made to produce a therapeutically useful calcium salt mixture of high solubility, but with little success. It was therefore not to be expected that a natural mixture of calcium idonate and calcium gluconate resulting from the hydrogenation of calcium-5-keto-gluconate would serve the purpose. However, it was found that this product, an amorphous solid when dry, is so soluble in water that the concentration of its aqueous solutions is limited only by practical considerations such as viscosity.

Example.—240 grams of calcium 5-keto-gluconate containing three molecules of water of crystallization $(C_6H_9O_7)_2Ca.3H_2O$ are suspended in 1000 cc. of distilled water and treated with 35 g. of Rainey nickel catalyst. The suspension is placed in an autoclave and heated at 60° C. with agitation under a hydrogen pressure of 100 atmospheres. After some 4 hours heating, the absorption of hydrogen ceases. The pressure is then released and the solution filtered from the catalyst, which can be reused without further treatment. Boiling a sample of the filtrate with Fehling's solution shows the absence of reducing substances, indicating complete hydrogenation.

The colorless filtrate is evaporated to dryness either under vacuum or on a steam bath; or alternatively the solid product may be precipitated with alcohol.

In either case, the product is an amorphous mixture of calcium l-idonate and calcium d-gluconate. This mixture is not crystallizable. It is useful in calcium therapy, being nontoxic and more soluble than any previously known calcium preparation. It is also possible to isolate from the mixture substantial amounts of the rare l-idonic acid in pure form, for instance by the method used by van Ekenstein and de Bruyn (Rec. trav. 18:305, 1899). Dibenzal l-idonic acid of melting point 225° C. can be obtained from the hydrogenated mixture. Hydrolysis of the dibenzal compound by means of dilute sulfuric acid gives a solution of pure l-idonic acid.

From l-idonic acid separated from the product of this invention, we have been able to prepare for the first time two crystalline idonates—namely sodium idonate and lithium idonate, by reacting the acid with a corresponding alkali.

Calcium-l-idonate, (or the mixture of calcium-l-iodonate and calcium d-gluconate resulting from our hydrogenation process) exerts a stabilizing effect upon over-saturation solutions of calcium gluconate. For example, if 100 grams of the dried hydrogenation mixture containing calcium idonate are added to an aqueous solution of 50 grams of calcium-d-gluconate in 600 cc. of water, the solution will remain stable. Such a solution obviously contains 20% of calcium aldonates, and since calcium idonate is an isomer of calcium gluconate the available calcium content is equivalent to that of a 20% solution of calcium gluconate.

More highly concentrated solutions of calcium gluconate may be stabilized by the addition of a larger proportion of calcium idonate, whether added as such or as a constituent of our hydrogenation product.

The invention claimed is:

1. As a new composition of matter, a mixture of calcium l-idonate and calcium d-gluconate, soluble in any practical proportion of water.

2. As a new composition of matter, a mixture of calcium l-idonate and calcium d-gluconate, obtained by the hydrogenation of calcium 5-keto-gluconate, amorphous when dry, and soluble in any practical proportion of water.

3. Process for producting a mixture of calcium d-gluconate and calcium l-idonate by hydrogenation of calcium 5-keto-gluconate in aqueous suspension under a pressure of above 80 atmospheres in the presence of a nickel catalyst at a temperature between 25 and 70° C.

RICHARD PASTERNACK.
ELLIS V. BROWN.